(12) United States Patent  
Ochi

(10) Patent No.: US 8,955,564 B2  
(45) Date of Patent: *Feb. 17, 2015

(54) PNEUMATIC TIRE

(75) Inventor: Naoya Ochi, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 488 days.

This patent is subject to a terminal disclaimer.

(21) Appl. No.: 13/263,881

(22) PCT Filed: Apr. 5, 2010

(86) PCT No.: PCT/JP2010/002491  
§ 371 (c)(1),  
(2), (4) Date: Oct. 28, 2011

(87) PCT Pub. No.: WO2010/116710  
PCT Pub. Date: Oct. 14, 2010

(65) Prior Publication Data  
US 2012/0037289 A1    Feb. 16, 2012

(30) Foreign Application Priority Data

Apr. 10, 2009   (JP) ................................ 2009-096072  
May 7, 2009    (JP) ................................ 2009-112721

(51) Int. Cl.  
  B60C 11/11   (2006.01)  
  B60C 11/03   (2006.01)  
  B60C 11/12   (2006.01)
(52) U.S. Cl.  
  CPC ............... B60C 11/11 (2013.01); B60C 11/033 (2013.01); B60C 2011/0353 (2013.01);  
  (Continued)
(58) Field of Classification Search  
  USPC .................... 152/209.1, 209.8, 209.9, 209.18  
  See application file for complete search history.

(56) References Cited

U.S. PATENT DOCUMENTS 5,031,680 A * 7/1991 Kajikawa et al. ......... 152/209.18  
5,120,209 A * 6/1992 MacMillan ..................... 425/40  
(Continued)

FOREIGN PATENT DOCUMENTS

CN        102395476 A      3/2012  
DE   10 2006 041 142 A1   3/2008  
(Continued)

OTHER PUBLICATIONS

English machine translation of JP08-002215, no date.*  
(Continued)

*Primary Examiner* — Justin Fischer  
*Assistant Examiner* — Robert Dye  
(74) *Attorney, Agent, or Firm* — Sughrue Mion, PLLC

(57) ABSTRACT

A pneumatic tire comprising, in a tread portion 1, at least two block groups GB, each block group being composed of a plurality of independent blocks 4 defined by grooves, wherein the block groups GB have at least two different values of block number densities D, each of the block number densities D being represented by the formula: $D=a/\{PL \times W \times (1-N/100)\}$, wherein PL (mm) represents a reference pitch length of the block 4 in the block group $G_{Bn}$, W (mm) represents a width of the block group, a (pieces) represents the number of the blocks existing in a reference zone of the block group, the reference zone being demarcated by the reference pitch length PL and the width W, and N (%) represents a negative ratio in the reference zone; wherein the block number density of at least one block group is within a range of 0.003 (pieces/$mm^2$) to 0.04 (pieces/$mm^2$).

13 Claims, 10 Drawing Sheets

(52) U.S. Cl.
CPC ............ *B60C 11/12* (2013.01); *B60C 11/0304* (2013.01); *B60C 2011/0341* (2013.01); *B60C 2011/0365* (2013.01)
USPC .................. 152/209.1; 152/209.8; 152/209.18

(56) References Cited

U.S. PATENT DOCUMENTS

| | | | | |
|---|---|---|---|---|
| 5,372,171 | A | * | 12/1994 | Miyazaki et al. .......... 152/209.8 |
| 8,720,506 | B2 | * | 5/2014 | Ochi ........................ 152/209.15 |

FOREIGN PATENT DOCUMENTS

| EP | 1 336 510 A1 | | 8/2003 |
|---|---|---|---|
| EP | 2 338 700 A1 | | 6/2011 |
| EP | 2 397 345 A1 | | 12/2011 |
| JP | 62-122804 | * | 6/1987 |
| JP | 7-290908 A | | 11/1995 |
| JP | 8-002215 A | | 1/1996 |
| JP | 8-318710 A | | 12/1996 |
| JP | 09-226326 | * | 9/1997 |
| JP | 11-348510 | * | 12/1999 |
| JP | 2002-178713 A | | 6/2002 |
| JP | 2002-192914 A | | 7/2002 |
| WO | 2008/146851 A1 | | 12/2008 |
| WO | 2010/032606 A1 | | 3/2010 |

OTHER PUBLICATIONS

English machine translation of JP08-318710, no date.*
English machine translation of JP09-226326, no date.*
Extended European Search Report issued in European Application No. 10761414.1 dated Jul. 15, 2013.
International Search Report for PCT/JP2010/002491, dated May 25, 2010.
Japanese Office Action, dated Apr. 2, 2013, issued in corresponding Japanese Patent Application No. 2009-096072, English translation.
Japanese Office Action, dated Apr. 16, 2013, issued in corresponding Japanese Patent Application No. 2009-112721, English translation.
Chinese Office Action, dated Sep. 4, 2013, issued in corresponding Chinese Patent Application No. 201080025946.3, English translation.
Japanese Office Action issued in Japanese Application No. 2009-096072 dated Oct. 1, 2013, English translation.
Japanese Office Action issued in Japanese Application No. 2009-112721 dated Oct. 1, 2013, English translation.
Office Action issued in Chinese Patent Application No. 201080025946.3 on Feb. 26, 2014, English translation.

* cited by examiner

PNEUMATIC TIRE

CROSS REFERENCE TO RELATED APPLICATIONS

This application is a National Stage of International Application No. PCT/JP2010/002491 filed Apr. 5, 2010, claiming priority based on Japanese Patent Application No. 2009-096072 filed Apr. 10, 2009 and Japanese Application No. 2009-112721 filed May 7, 2009, the contents of all of which are incorporated herein by reference in their entirety.

FIELD OF THE INVENTION

The present invention relates to a pneumatic tire having, in a tread portion, a large number of blocks which are defined by grooves. Particularly, the present invention relates to realizing, in addition to dramatic improvement of on-ice performance, a balance with other performances.

DESCRIPTION OF THE RELATED ART

In conventional pneumatic tire, in order to improve the on-ice performance and the like by increasing edge effect, it is widely implemented that, as shown in FIG. 8, in the tread portion 100, blocks 103 are formed by longitudinal grooves 101 extending in the tire circumferential direction and lateral grooves 102 extending in the tire width direction, and a plurality of sipes 104 are provided on the blocks 103. In such conventional pneumatic tire, under the demand for higher driving, breaking and cornering performances, in order to arrange more sipes 104 on the blocks 103 and to improve the on-ice performance by enlarged ground contact area, the number of block row is reduced to 3 to 9 and each block 103 is formed into oblong shape in the tire circumferential direction, as is disclosed in Japanese Patent Application Laid-Open Publication No. 2002-192914.

RELATED ART DOCUMENT

Patent Literature

Patent Literature 1: Japanese Patent Application Laid-Open Publication No. 2002-192914

SUMMARY OF THE INVENTION

Problems to be Solved by the Invention

Disadvantageously, in such conventional pneumatic tire, since divided block portions 103a divided by the sipes 104 become thin shape and the stiffness thereof are reduced, the divided block portions collapse when contacting the ground, whereby the ground contact property is exacerbated. Therefore, it is difficult to obtain sufficient on-ice performance consistent with vehicle performance of recent years. In addition, since each block 103 is large, water screen between ice and tire at the central region of the block 103 can not be removed during braking by only providing the sipes 104. From this reason as well, it is difficult to significantly improve the on-ice performance. In the meantime, since the pneumatic tire is used for running on not only ice road but also wet road or dry road, it is necessary to balance the on-ice performance and other performances such as driving stability on wet road or dry road.

Therefore, the present invention aims at solving the problems described above, and an object thereof is, in addition to dramatic improvement of on-ice performance, to balance with other performances, by optimizing a tread pattern.

Means for Solving the Problems

In order to achieve the object described above, the present invention provides a pneumatic tire comprising, in a tread portion, at least two block groups, each block group being composed of a plurality of independent blocks defined by grooves, wherein the block groups have at least two different values of block number densities D, each of the block number densities D being represented by the formula:

$$D = a / \{PL \times W \times (1 - N/100)\}$$

wherein PL (mm) represents a reference pitch length of the block in the block group, W (mm) represents a width of the block group, a (pieces) represents the number of the blocks existing in a reference zone of the block group, the reference zone being demarcated by the reference pitch length PL and the width W, and N (%) represents a negative ratio in the reference zone;

wherein the block number density of at least one block group is within a range of 0.003 (pieces/mm$^2$) to 0.04 (pieces/mm$^2$).

Here, the term "block group" is defined as aggregation of blocks having same reference pitch length. The term "reference pitch length of the block" refers to one or more than one unit of a repeating pattern, in the tire circumferential direction, of the block in the block group. For example, in a case where the repeating pattern in the tire circumferential direction is composed of one block and one groove adjacent to the block, the reference pitch length of the block can be calculated by adding the length of the block in the tire circumferential direction to the length of the adjacent groove in the tire circumferential direction. Further, the term "width of the block group" refers to the distance which is obtained by measuring the block group along the tire width direction. In addition, the term "block number density" refers to how many blocks exist in per unit of real contacting area (total area of all blocks in the reference zone) in the reference zone, as density.

According the pneumatic tire of the present invention, since the block number density of at least one block group is within the range of 0.003 (pieces/mm$^2$) to 0.04 (pieces/mm$^2$), blocks can be arranged in close formation, whereby it is possible to increase a total periphery length (total edge length) of the blocks. Thus, it is possible to obtain more effective edges for on-ice running than the conventional winter tire having sipes, without reduction of block stiffness. Further, each of the surface area of the block can be much smaller than the conventional one, whereby it is possible to improve a ground contact property of each block, and it is possible to reduce the distance from the central region to peripheral region of the block to effectively remove the water screen in the central zone of the block. Furthermore, according to the constitution in which the blocks are arranged so as to have different block number density for each block group, by varying the block number density, depending on targets, with respect to each part of the tread portion, other performances than on-ice performance can be easily achieved.

Therefore, according to the pneumatic tire of the present invention, with the aforementioned interaction, excellent ground contact property and edge effect, effective removal of water screen by means of blocks can be obtained, in addition to these, by means of arrangement of block groups having at least two different block number densities, it is possible to not only dramatically improve the on-ice performance, but to balance with other performances.

In the pneumatic tire of the present invention, it is preferable that the block number densities of all of the at least two block groups are within a range of 0.003 (pieces/mm$^2$) to 0.04 (pieces/mm$^2$).

In the pneumatic tire of the present invention, it is preferable that the block number density of at least one of the at least two block groups is less than 0.003 (pieces/mm$^2$).

In the pneumatic tire of the present invention, it is preferable that the pneumatic tire further comprises two circumferential main grooves extending along the tire circumferential direction;
  wherein one of the block groups is arranged between the adjacent circumferential main grooves;
  wherein the block number density of the block group defined by the adjacent circumferential main grooves is constant.

In the pneumatic tire of the present invention, it is preferable that the tread portion has a center region and shoulder regions, the center region being, on both side of a tire equatorial plane, 10% to 40% of a tread width for each side, each of the shoulder regions being, from each tread end in the tire width inward direction, 40% to 10% of the tread width;
  wherein the center region includes the block group whose block number density is within the range of 0.003 (pieces/mm$^2$) to 0.04 (pieces/mm$^2$);
  wherein each of the shoulder region includes the block group whose block number density is less than 0.003 (pieces/mm$^2$).

In the pneumatic tire of the present invention, it is preferable that the pneumatic tire is designated a mounting direction to a vehicle, and further comprises a circumferential main groove extending along the tire circumferential direction and dividing, in the tire width direction, a center region of the tread portion into sections, the center region being, on both side of a tire equatorial plane, 10% to 40% of a tread width for each side;
  wherein, in the situation where the tire is mounted to the vehicle, the section of the center region closer to the vehicle than the circumferential main groove includes the block group whose block number density is less than 0.003 (pieces/mm$^2$);
  wherein, in the situation where the tire is mounted to the vehicle, the section of the center region away from the vehicle than the circumferential main groove includes the block group whose block number density is within the range of 0.003 (pieces/mm$^2$) to 0.04 (pieces/mm$^2$).

In the pneumatic tire of the present invention, it is preferable that the pneumatic tire is designated a mounting direction to a vehicle being designated, and further comprises a circumferential main groove extending along the tire circumferential direction and dividing, in the tire width direction, a center region of the tread portion into sections, the center region being, on both side of a tire equatorial plane, 10% to 40% of a tread width for each side;
  wherein, in the situation where the tire is mounted to the vehicle, the section of the center region closer to the vehicle than the circumferential main groove includes the block group whose block number density is within the range of 0.003 (pieces/mm$^2$) to 0.04 (pieces/mm$^2$), and the section of the center region away from the vehicle than the circumferential main groove includes the block group whose block number density is less than 0.003 (pieces/mm$^2$).

In the pneumatic tire of the present invention, it is preferable that the pneumatic tire further comprises at least two circumferential main groove extending along the tire circumferential direction and forming land portion therebetween;
  wherein the land portion includes the block group whose block number density is within the range of 0.003 (pieces/mm$^2$) to 0.04 (pieces/mm$^2$), and at lease one block group adjacent to at lease one circumferential main grope and whose block number density is less than 0.003 (pieces/mm$^2$).

In the pneumatic tire of the present invention, it is preferable that the pneumatic tire further comprises, in the tread portion, at least one circumferential main groove including see-through groove portion, the see-through groove portion linearly extending in the tire circumferential direction.

In the pneumatic tire of the present invention, it is preferable that the pneumatic tire further comprises, in the tread portion, at least one inclined transverse groove inclining with respect to the tire width direction.

In the pneumatic tire of the present invention, it is preferable that the at least two block groups are divided, one another, by the circumferential main groove or the inclined transverse groove.

In the pneumatic tire of the present invention, it is preferable that, in the tread portion, equal to or more than two block groups whose block number densities are within the range of 0.003 (pieces/mm$^2$) to 0.04 (pieces/mm$^2$) and different from each other are provided.

In the pneumatic tire of the present invention, it is preferable that a block number density Da (pieces/mm$^2$), in a reference zone of the tread portion, is within a range of 0.003 (pieces/mm$^2$) to 0.04 (pieces/mm$^2$), the block number density Da being represented by the formula:

$$Da = A/\{PL \times TW \times (1 - Na/100)\}$$

wherein PL (mm) represents a reference pitch length of the block in any one of the block groups, TW (mm) represents a contact width of a tread contact area, A (pieces) represents the number of the blocks existing in a reference zone of the tread portion, the reference zone being demarcated by the reference pitch length PL and the contact width TW, and Na (%) represents a negative ratio in the reference zone of the tread portion.

Effect of the Invention

According to the present invention, in addition to dramatic improvement of on-ice performance, it is possible to balance with other performances.

BEST MODE FOR IMPLEMENTING THE INVENTION

Figure 1:
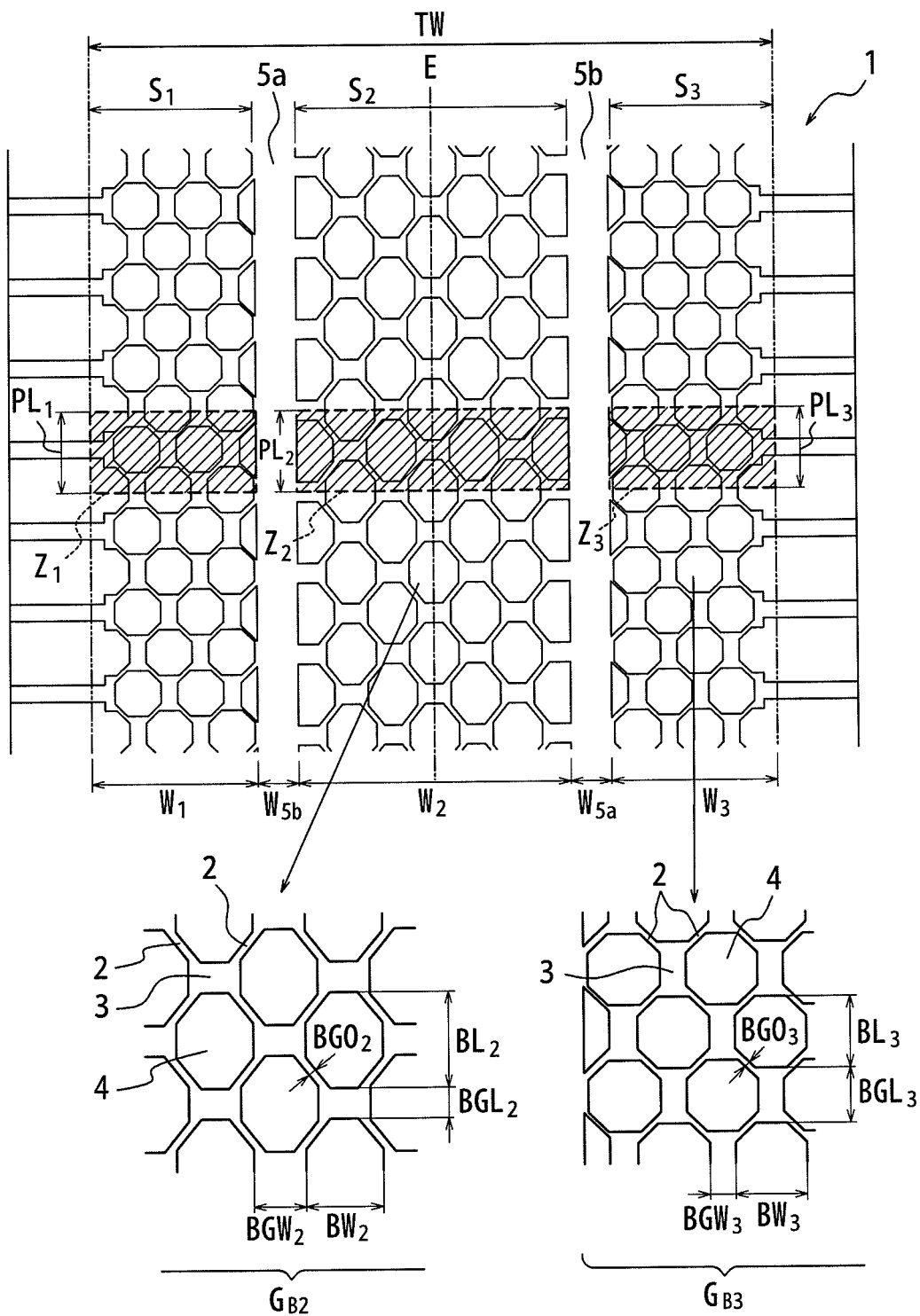
FIG. 1 is a partial development view showing a tread pattern of a pneumatic tire (tire of Example 1) according to an embodiment of the present invention.

Hereinafter, embodiments of the present invention will be described with reference to the drawings. FIG. 1 is a partial development view showing a tread pattern of a pneumatic tire (hereinafter, referred to as "tire") according to an embodiment of the present invention. Note that, in the drawing, a vertical direction represents a tread circumferential direction, and a horizontal direction (direction perpendicular to an equatorial plane E) represents a tread width direction.

The tire of the present embodiment comprises, although not shown in the drawings, a conventional tire structure which includes a carcass toroidally extending between a pair of right and left bead cores, a belt provided radially outside of the crown portion of this carcass, and a tread portion provided radially outside the belt. The tire has a tread pattern illustrated in FIG. 1 on the tread portion.

As shown in FIG. 1, the tread portion 1 has center region $S_2$ which includes the tire equatorial plane E, and a pair of shoulder regions $S_1$, $S_3$ which lie outside this center region $S_2$ in tire width direction and respectively include a tread end. These center region $S_2$ and shoulder regions $S_1$, $S_3$ respectively comprise a large number of blocks 4, the blocks 4 being formed, with equal pitch in the circumferential direction, by a plurality of longitudinal grooves 2 extending in the tire circumferential direction and a plurality of lateral grooves 3 extending in the tire width direction to connect the adjacent longitudinal grooves 2, in the tire width direction, with one another. Each of the regions $S_1$ to $S_3$ is filled with lot of blocks 4, whereby block groups $G_{B1}$, $G_{B2}$, $G_{B3}$ are constituted. The center region $S_2$ is, on both side of the tire equatorial plane, 10% to 40% of a tire contact width TW for each side; each of the shoulder regions $S_1$, $S_3$ is, from each tread end inward in the tire width direction, 40% to 10% of the tire contact width TW.

The tread portion 1 also has at least one circumferential main groove, two circumferential main grooves in this example, 5a and 5b, each including see-through groove portion linearly extending along the tire circumferential direction. Aforementioned block groups $G_{B1}$ to $G_{B3}$ are arrange so as to share the circumferential main grooves 5a, 5b as boundaries, i.e., the block group $G_{B2}$ of the center region $S_2$ and the block groups $G_{B1}$, $G_{B3}$ of the shoulder regions $S_1$, $S_3$ are separated and partitioned by the circumferential main grooves 5a, 5b. The circumferential main grooves 5a, 5b are wider than the longitudinal grooves 2 and do not close when contacting the ground.

In this example, the contour shape of the surface of each block 4 is octagon. The blocks 4 in each of the regions $S_1$ to $S_3$ (the block groups $G_{B1}$ to $G_{B3}$) are arranged in zigzag alignment with respect to the tire circumferential direction. The size of each block 4 is smaller than that of the conventional pattern shown in FIG. 8. In particular, the groove width BGO of the longitudinal groove 2 is within a range of 0.1 mm to 1.2 mm; the groove depth of the longitudinal groove 2 is within a range of 1 mm to 10 mm; and the length of the longitudinal groove 2 is within a range of 1 mm to 15 mm. The groove width BGL of the lateral groove 3 is within a range of 1.2 mm to 10 mm; and the groove depth of the lateral groove 3 is within a range of 2 mm to 11 mm. The circumferential length BL of the block 4 is within a range of 5 mm to 25 mm; the area of the surface of the block 4 is within a range of 25 mm² to 330 mm². The distance BGW between the block and next block but one in the tire width direction is within a range of 2.5 mm to 10 mm.

By the providing such lateral grooves 3, the lateral grooves 3 hold water when contacting the ground, whereby the driving stability on wet road can be improved. In addition, by providing such longitudinal grooves 2, the reduction of the block stiffness is prevented, whereby the ground contact property of the block 4 can be improved.

In such tire, it is preferable that at least three sides, four sides in this example, of the contact surface of the block 4 are formed by the longitudinal grooves 2. According to this, the collapse of the block 4 is certainly reduced, whereby the driving stability on dry road and wet road can be improved.

In addition, according to the tire, since blocks 4 are arranged in close formation with sufficient groove area in the block groups $G_{B1}$ to $G_{B3}$, the total edge length and edge directions (i.e., the number of edges extending in different directions) of the blocks 4 are increased, whereby excellent edge effect can be obtained. Further, since the sizes of the blocks 4 are small, the ground contact property of the each block is improved, whereby the braking performance and driving stability on a road whose friction coefficient µ is low, such as ice road and wet road, can be improved. Furthermore, by downsizing of each block 4, the distance from the center portion of the block 4 to the marginal portion thereof is decreased, whereby the removal effect of water screen, by the block 4, can be improved. Although the larger the blocks 4 are and the higher the density of blocks, the better edge effect and water removal effect can be obtained, the optimum range is as below. That is, a block number density $D_n$ (Note that n is a number specifying one of the block groups.) means the number of blocks 4 per unit of real ground contact area in a reference zone and is represented by the formula:

$$D_n = \frac{a_n}{PL_n \times W_n \times (1 - N_n/100)} \quad \text{[Formula 1]}$$

wherein $PL_n$ (mm) represents a reference pitch length of the block 4 in the tire circumferential direction, $W_n$ (mm) represents a width of the each block group $G_{Bn}$, $a_n$ (pieces) represents the number of the blocks 4 existing in the each reference zone $Z_n$ (hatched area in the drawing), the reference zone $Z_n$ being demarcated by the reference pitch length $PL_n$ and the width $W_n$, and $N_n$ (%) represents a negative ratio in the each reference zone $Z_n$. The block number density $D_n$ indicates that how many blocks 4 exist per unit (mm²) of the real ground contact area (which does not include the area of the grooves) of the block group $G_{Bn}$, as a density. Note that, at the time of counting the number "$a_n$" of the blocks 4 existing in the reference zone $Z_n$, in a case where certain block 4 extends across the both inside and outside of the reference zone $Z_n$ and cannot be counted as one block, the block 4 is counted as a proportion of the remaining area of the block 4 in the reference zone to the surface area of this block 4. For example, the block 4 which extends across both inside and outside of the reference zone $Z_n$ and only a half portion of which exists in the reference zone $Z_n$, can be counted as ½ piece. In this example, all of the block number densities $D_1, D_2, D_3$ are with in a range a range of 0.003 (pieces/mm$^2$) to 0.04 (pieces/mm$^2$). Just for reference, since, in the conventional winter tire having sipes, the block number density D is about 0.002 (pieces/mm$^2$), it is clear that the tire of the present embodiment has large number of blocks in the tread portion 1.

In a case where the number density $D_n$ in the block group $G_{Bn}$ is less than 0.003 (piece/mm$^2$), it is difficult to obtain high edge effect without forming sipes. On the other hand, in a case where the number density $D_n$ is more than 0.04 (piece/mm$^2$), the blocks 4 become too small to achieve desired block rigidity. It is preferable that the block number density $D_n$ of the block group $G_{Bn}$ is within a range of 0.0035 to 0.03 piece/mm$^2$ to satisfy both of the stiffness of the blocks 4 and the edge effect at high levels.

In addition, in this tire, the block number density $D_n$ of the each block group $G_{Bn}$ is determined to provide at least two (two, in this example) different values of the block number densities. That is, the tread portion 1 has the block groups $G_{B1}$ to $G_{B3}$ which provide two or more different values of the block number densities $D_1$ to $D_3$. More specifically, in the embodiment as shown in FIG. 1, the block number density $D_2$ of the block group $G_{B2}$ of the center region $S_2$ is smaller than the block number densities $D_1, D_3$ in the block groups $G_{B1}, G_{B3}$ in the both shoulder regions $S_1, S_3$, and the block number densities $D_1, D_3$ of the block groups $G_{B1}, G_{B3}$ in the both shoulder regions $S_1, S_3$ are equal one another.

Further, in this tire, the block number density of the block group $G_{B2}$ defined by the adjacent circumferential main grooves 5a, 5b in the tire width direction is constant. The block number densities vary therebetween across the circumferential main grooves 5a, 5b.

According to the tire of the present embodiment, by arranging the blocks 4 in close formation, the ground contact property of the tread is improved, whereby, in particular, the braking and tracking performances on ice are improved. In the conventional tire, since on-ice performance is aimed to improve by providing a large number of sipes on a relatively large block, the divided block portions between the sipes collapse during contacting the ground and it is difficult to allow the blocks to uniformly contact the ground, whereby the improvement of the on-ice performance is limited. Compared to this, according to the present invention, since a large number of the blocks 4 are provided in close formation so that the number density $D_n$ is within the predetermined range, total edge length can be increased and higher edge effect can be obtained than that of sipe type winter tire.

Further, in the conventional configuration having sipes on the relatively large block, it is difficult to remove water screen on the ice surface portion corresponding to the block surface central region. Compared to this, according to the present invention, since the block surface area of the block 4 is made relatively small, the distance from the center portion of the block 4 to the marginal portion thereof is decreased, whereby it is possible to effectively improve the water removal property.

The characterized performance of the blocks 4 of each of the block groups $G_{B1}$ to $G_{B3}$ can be changed by varying their block number densities $D_1$ to $D_3$. Where the block number density $D_n$ is close to 0.003, the block stiffness is high, whereby driving stability on dry/wet road becomes good. Where the block number density $D_n$ is close to 0.04, the number of blocks $a_n$ in the ground contact area can be large, whereby on-ice performance, rolling resistance, silence performance, and so on can be improved. In order to improve these performances in a balanced manner, it is preferable that the block number density $D_n$ is close to 0.0065. By setting the block number density $D_n$ for different purposes on every region of tread portion 1, the target performance can be achieved. For example, if a handling performance on dry/wet road is important, the blocks 4 in the center region $S_2$ are made large and the block number density $D_n$ thereof is set small. According to this, the stiffness in the tire center region can be increases, then the handling performance can be secured. On the other hand, by the block number densities $D_n$ of the shoulder regions $S_1, S_3$ being close to 0.006, with the balance paramount in mind, the on-ice/snow performances can be improved.

In addition, according to the tire of the present embodiment, by being provided the circumferential main grooves 5a, 5b along the tire circumferential direction in the tread portion, even if the block number density of the each block is relatively large, water evacuation performance can improved. Further, by separating or partitioning, with the circumferential main grooves 5a, 5b, the block group $G_{B2}$ of the center region $S_2$ from the block groups $G_{B1}, G_{B3}$ of the shoulder regions $S_1, S_3$, it is possible to clearly separate the functions of block groups $G_{Bn}$ one another, whereby the target performances can be further secured.

Further, according to the tire of the present embodiment, by arranging the blocks 4 of each block group $G_{Bn}$ in zigzag alignment, more blocks 4 can be formed and the edges thereof can fulfill their function one after the other when the tire is rotated, whereby the edge effect can be exerted in a more effective manner. In addition, by arranging the blocks 4 in zigzag alignment, the ground contact timings of blocks 4, which are adjacent to one another in the tire width direction, can differ between the blocks 4, whereby a pattern noise can also be reduced. Yet further, by arranging the blocks 4 in zigzag alignment, the high-density arrangement of blocks can be easily realized. By arranging blocks 4 in zigzag alignment in tire circumferential direction and increasing the block number density $D_n$, the adjacent blocks 4 can support each other when high load is applied to the blocks 4, whereby it is possible to further increase the stiffness of the blocks 4, then to further improve the on-ice performance.

Furthermore, according to the tire of the present embodiment, by the block number density of the block group $G_{B2}$, which is defined by the circumferential main grooves 5a, 5b adjacent one another in tire width direction, being constant, the block number density does not vary in the block group defined by the adjacent circumferential main grooves 5a, 5b, whereby variations in the stiffness of blocks 4 can be prevented, then uneven wear can be prevented. The change in the block number density is given by the intervention of the circumferential main grooves 5a, 5b, that is, the stiffness of the blocks 4 are changed with a distance therebetween, whereby it is possible to prevent the portion, where the block stiffness is changed, from being a center of uneven wear.

Figure 2:
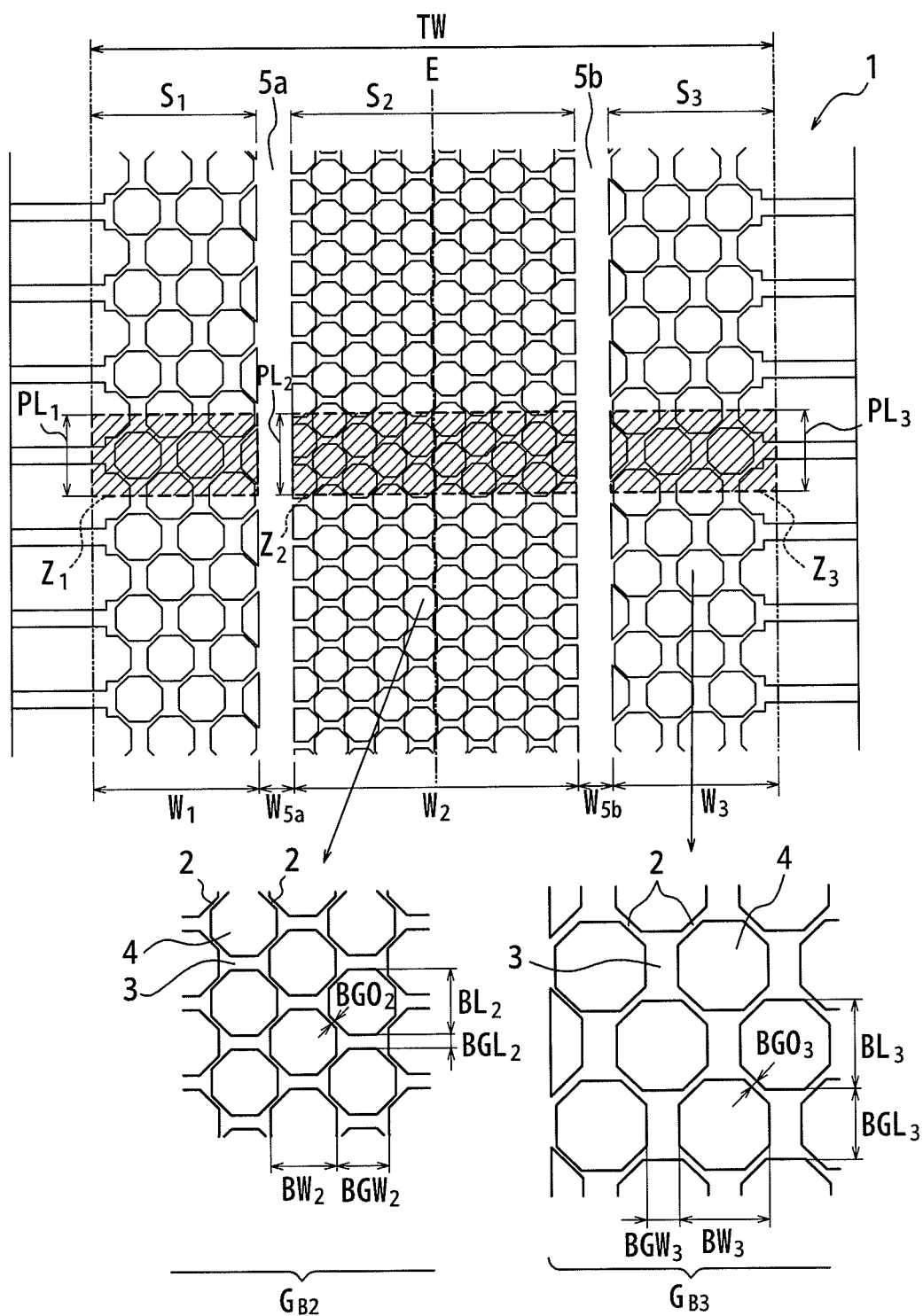
FIG. 2 is a partial development view showing a tread pattern of a pneumatic tire (tire of Example 2) according to another embodiment of the present invention.

Next, another embodiment of the present invention will be described. FIG. 2 is a partial development view showing a tread pattern of a pneumatic tire according to another embodiment of the present invention. It should be noted that like elements as those in FIG. 1 are designated with like reference numerals and detailed descriptions thereof are omitted.

In the embodiment shown in FIG. 2, the block number density $D_2$ of the block group $G_{B2}$ in the center region $S_2$ is higher than the block number densities $D_1, D_3$ of the block groups $G_{B1}, G_{B3}$ in both of the shoulder regions $S_1, S_3$ and the block number densities $D_1$, $D_3$ of the block groups $G_{B1}$, $G_{B3}$ in both of the shoulder regions $S_1$, $S_3$ are equal each other. The block number densities $D_1$ to $D_3$ are all within the range of 0.003 (pieces/mm$^2$) to 0.04 (pieces/mm$^2$).

According to the tire of the present embodiment, since the block number density $D_2$ is increased by making the blocks 4 of the block group $G_{B2}$ in the center region $S_2$ small, and on the other hand, the block number densities $D_1$, $D_3$ by making the blocks 4 of the block groups $G_{B1}$, $G_{B3}$ in the shoulder regions $S_1$, $S_3$ relatively large, it is possible to improve the on-ice/snow performance as well as enhance the stiffness of the blocks 4 in the shoulder regions $S_1$, $S_3$, which easily wear because of a differential in outside diameter, whereby both performances can be balanced.

Figure 3:
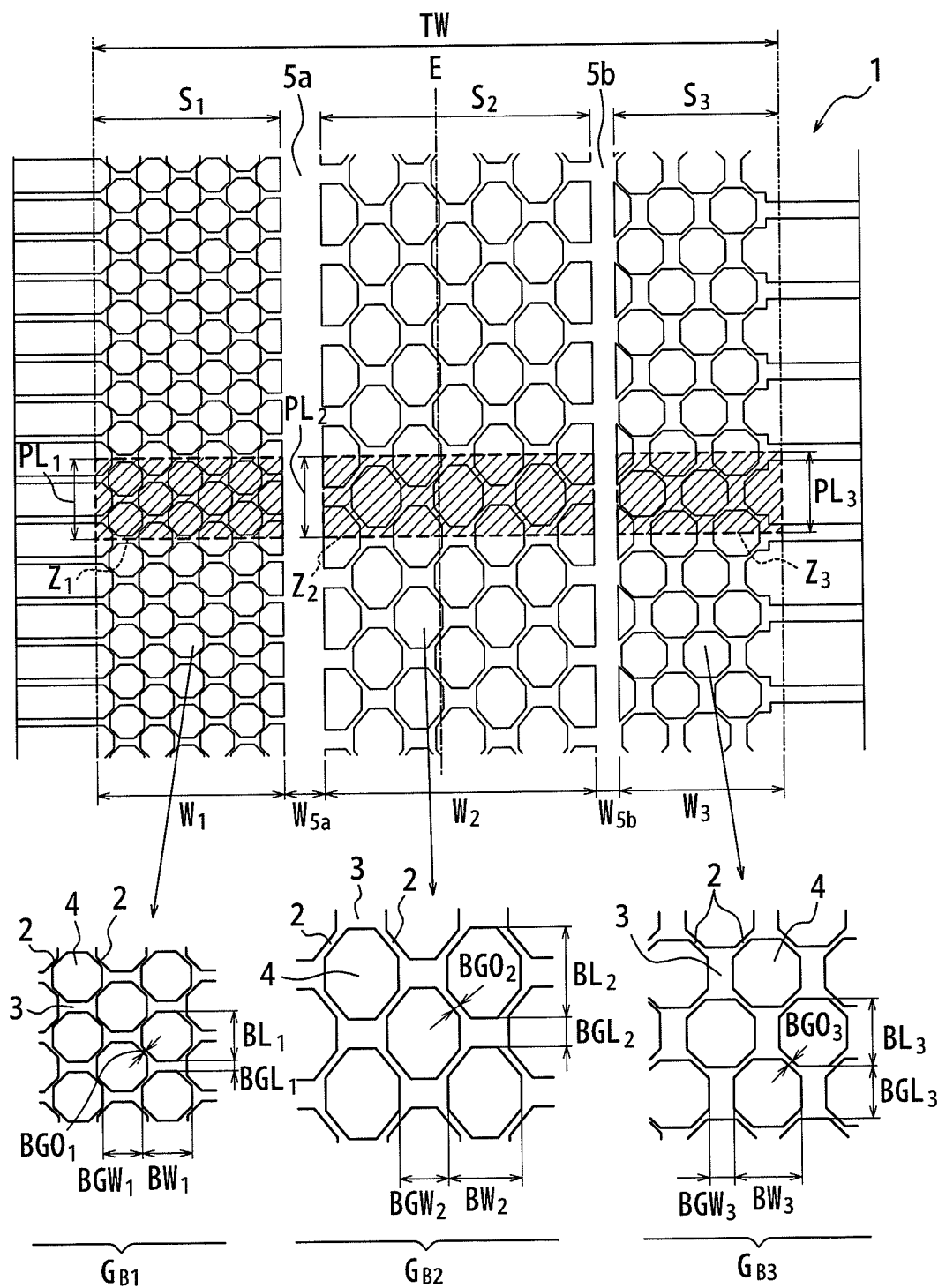
FIG. 3 is a partial development view showing a tread pattern of a pneumatic tire (tire of Example 3) according to another embodiment of the present invention.

Next, another embodiment of the present invention will be described. FIG. 3 is a partial development view showing a tread pattern of a pneumatic tire according to another embodiment of the present invention. It should be noted that like elements as those in FIG. 1 are designated with like reference numerals and detailed descriptions thereof are omitted.

The tire of the embodiment shown in FIG. 3 is designated a mounting direction to a vehicle. In this tire, the block number densities $D_1$, $D_3$ of the block groups $G_{B1}$, $G_{B3}$ in both of the shoulder regions $S_1$, $S_3$ and the block number density $D_2$ of the block group $G_{B2}$ in the center region $S_2$ differ from one another. Specifically, in the situation where the tire is mounted to the vehicle, the relation among the block number density $D_1$ of the shoulder region $S_3$ on proximal side from vehicle, the block number density $D_3$ of the shoulder region $S_3$ on distal side from vehicle, and the block number density $D_2$ of the center region $S_2$ is $D_1 > D_3 > D_2$. The groove widths of the circumferential main grooves 5a, 5b provided right and left side in the tire width direction are different from each other, the groove width $W_{5a}$ of the circumferential main groove 5a located on the proximal side from the vehicle (inside) is larger than the groove width $W_{5b}$ of the circumferential main groove 5b located on the distal side from the vehicle (outside).

According to the tire of the present embodiment, by making the block number density $D_2$ of the center region $S_2$ small, that is, by making the block 4 large, the circumferential stiffness in the portion near tread center, which works for dry/wet driving, can be enhanced, whereby traction and braking performances can be improved. In addition, by enhancing the block stiffness in the shoulder region $S_3$ on outside, advantageous configuration for cornering performance can be obtained, whereby the cornering performance on dry and wet roads can be improved. Further, by making the circumferential main groove 5a on inside wide, high hydroplaning performance can be secured. Improved on-ice performance can be secured by the shoulder region $S_1$ on inside, which has the relatively high block number density.

Figure 4:
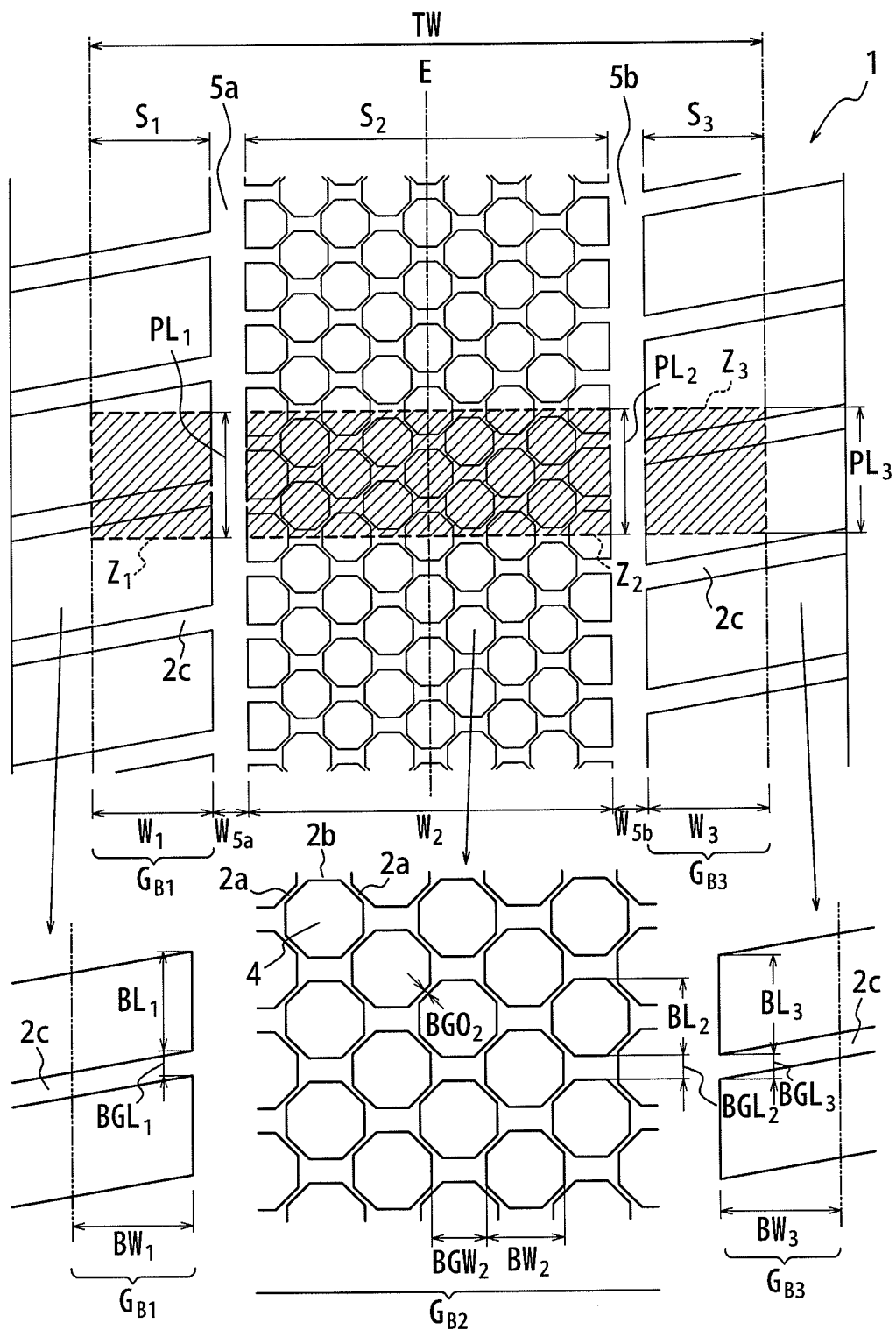
FIG. 4 is a partial development view showing a tread pattern of a pneumatic tire (tire of Example 4) according to another embodiment of the present invention.

Next, another embodiment of the present invention will be described. FIG. 4 is a partial development view showing a tread pattern of a pneumatic tire according to another embodiment of the present invention. It should be noted that like elements as those in FIG. 1 are designated with like reference numerals and detailed descriptions thereof are omitted.

In the embodiment shown in FIG. 4, the block number density $D_2$ of the block group $G_{B2}$ in the center region $S_2$ is within the range of 0.003 (pieces/mm$^2$) to 0.04 (pieces/mm$^2$), and the block number densities of block groups $G_{B1}$, $G_{B3}$ in shoulder region $S_1$, $S_3$ are less than 0.003 (pieces/mm$^2$).

Further, a block number density Da in a reference zone of the tread portion is within a range of range of 0.003 (pieces/mm$^2$) to 0.04 (pieces/mm$^2$). The block number density Da is represented by the formula:

$$Da = \frac{A}{PL_n \times TW \times (1 - N_a/100)} \quad \text{[Formula 2]}$$

wherein $PL_n$ (mm) represents a reference pitch length in the tire circumferential direction of the block 4 of any one of the block groups $G_{B1}$ to $G_{B3}$, TW (mm) represents a contact width of a tread contact area, A (pieces) represents the number of the blocks 4 existing in a reference zone (not shown) of the tread portion, the reference zone being demarcated by the reference pitch length $PL_n$ and the tread width TW, and Na (%) represents a negative ratio in the reference zone. The block number density Da indicates, as a density, that how many blocks 4 exist per unit (mm$^2$) of the real ground contact area (which does not include the area of the grooves) of the blocks 3 in the reference zone.

According to the tire of the present embodiment, in the center region $S_2$, on-ice performance is improved by arranging the blocks 4 in close formation. However, in a case where, in all regions $S_1$ to $S_2$, the block number densities $D_1$ to $D_3$ are within the range of 0.003 (pieces/mm$^2$) to 0.04 (pieces/mm$^2$), it is advantageous in the improvement of on-ice performance, but it might be difficult to balance with other performances due to the size reduction of the blocks 4. For this reason, in this embodiment, in addition to the block group $G_{B2}$ whose block number density $D_n$ is within the range of 0.003 (pieces/mm$^2$) to 0.04 (pieces/mm$^2$), the block groups $G_{B1}$, $G_{B3}$ whose block number densities are less than 0.003 (pieces/mm$^2$) and which are composed of relatively large blocks are provided, whereby it is provided the balance between the significant improvement of on-ice performance and other performances, depending on the block stiffness or the like, such as driving stability and anti-uneven wear performance.

That is, if all blocks 4 in the tread portion are provided so that the block number densities $D_n$ are within the range of 0.003 (pieces/mm$^2$) to 0.04 (pieces/mm$^2$), sufficient performance can not be obtained due to the luck of block stiffness, for the tire being emphasized, as the target performance, on handling performance on dry road or the like. For this reason, for a part of the blocks 4 in the tread portion, by setting the block number density $D_n$ less than 0.003 (pieces/mm$^2$) to increase the area of these blocks 4, the stiffness of the part of the blocks required for obtaining the target performance can be enhanced, whereby the performance can be improved.

In addition, according to the tire of the present embodiment, the block number density Da of the tread contact area is within the range of 0.003 (pieces/mm$^2$) to 0.04 (pieces/mm$^2$), whereby on-ice performance, as the whole tread portion, can be improved. This is because, although the block number density Da as the whole tread portion is decreased due to the provision of the block groups $G_{B1}$, $G_{B3}$ whose block number densities are less than 0.003 (pieces/mm$^2$), the block number density Da of the reference zone of the tread portion is within the above range, whereby it is possible to reduce deterioration of on-ice performance as the whole tread portion.

Figure 5:
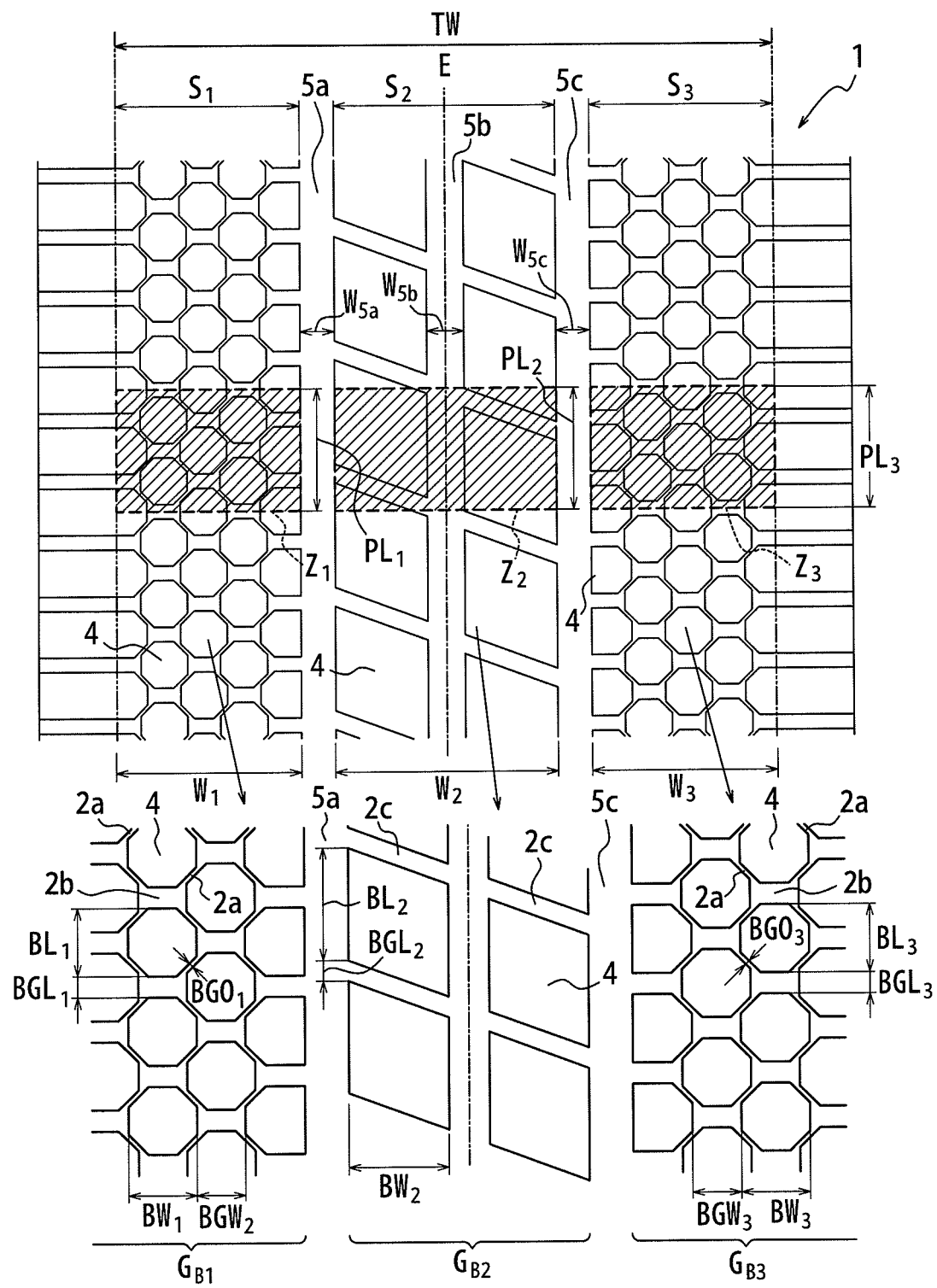
FIG. 5 is a partial development view showing a tread pattern of a pneumatic tire (tire of Example 5) according to another embodiment of the present invention.

Next, another embodiment of the present invention will be described. FIG. 5 is a partial development view showing a tread pattern of a pneumatic tire according to another embodiment of the present invention. It should be noted that like elements as those in FIG. 1 are designated with like reference numerals and detailed descriptions thereof are omitted.

In the embodiment shown in FIG. 5, the block number density $D_2$ of the block group $G_{B2}$ in center region $S_2$ is less than 0.003 (pieces/mm$^2$), on the other hand, the block number densities $D_1$, $D_3$ of the block groups $G_{B1}$, $G_{B3}$ in both of the shoulder regions $S_1$, $S_3$ are within the range of 0.003 (pieces/mm$^2$) to 0.04 (pieces/mm$^2$).

According to the tire of the embodiment, the blocks 4 in the center region $S_2$ can be large to enhance the block stiffness, and the blocks 4 in the shoulder regions $S_1$, $S_3$ can be favorable size and density for especially on-ice performance, whereby it is possible to improve the on-ice performance, as well as enhance the driving stability on dry and wet roads in particular.

Figure 6:
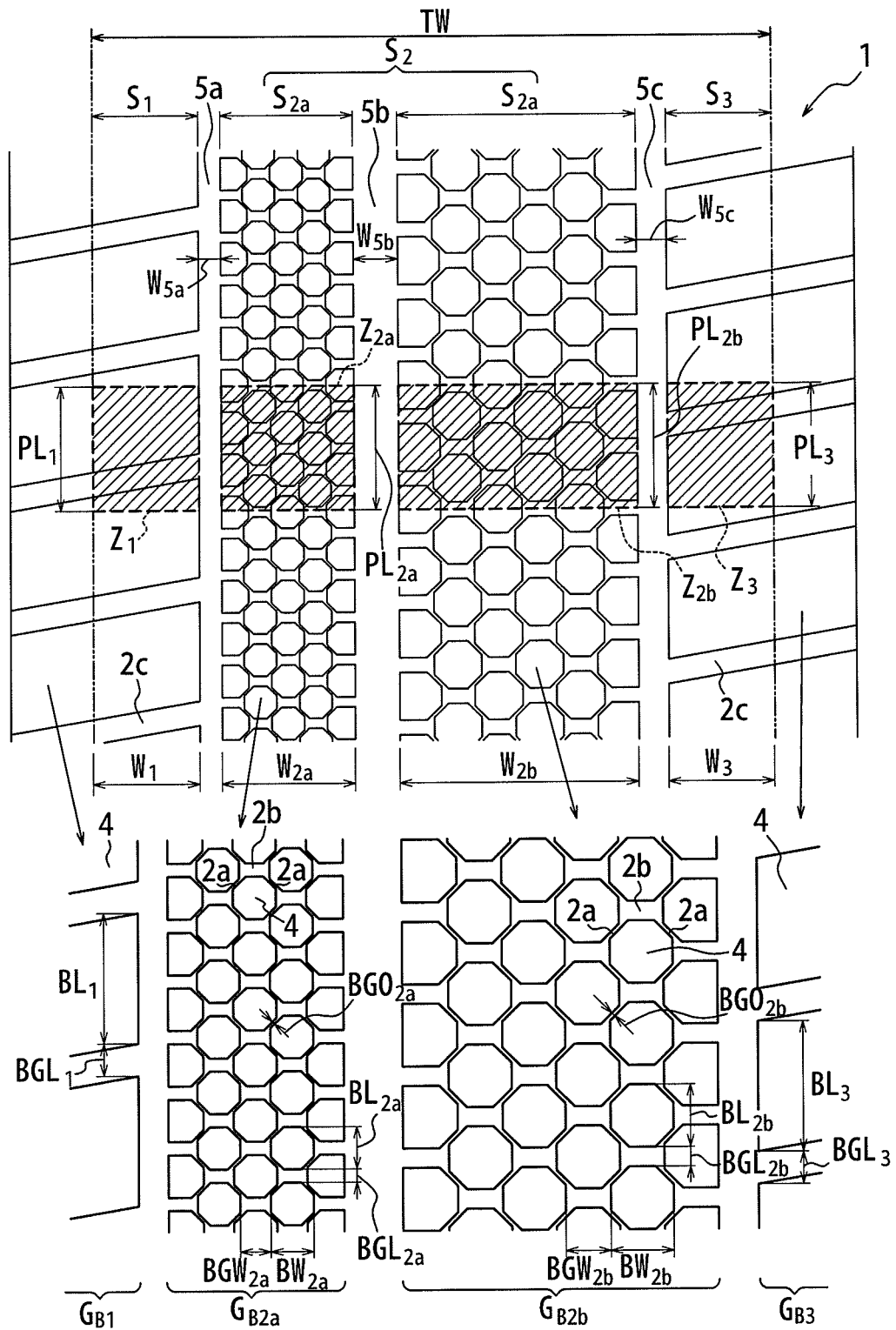
FIG. 6 is a partial development view showing a tread pattern of a pneumatic tire (tire of Example 6) according to another embodiment of the present invention.

Next, another embodiment of the present invention will be described. FIG. 6 is a partial development view showing a tread pattern of a pneumatic tire according to another embodiment of the present invention. It should be noted that like elements as those in FIG. 1 are designated with like reference numerals and detailed descriptions thereof are omitted.

The tire of the embodiment shown in FIG. 6 is designated a mounting direction to a vehicle. In this tire, the center region $S_2$ further divided, by the circumferential main groove 5b, into a first center region $S_{2a}$ (on proximal side from the vehicle in the mounted situation to the vehicle) and a second center region $S_{2b}$ (on distal side from the vehicle in the mounted situation to the vehicle). The block number densities $D_{2a}$, $D_{2b}$ of the first center region $S_{2a}$ and the second center region $S_{2b}$ are within the range of 0.003 (pieces/mm$^2$) to 0.04 (pieces/mm$^2$) and differ from each other. The block number densities $D_1$, $D_3$ of the shoulder regions $S_1$, $S_3$ are less than 0.003 (pieces/mm$^2$). More specifically, the relation between the block number density $D_{2a}$ of the first center region $S_{2a}$ and the block number density $D_{2b}$ of the second center region $S_{2b}$ is $D_{2a} > D_{2b}$. In addition, the groove width $W_{5a}$, $W_{5b}$, $W_{5c}$ differ from one another ($W_{5b} > W_{5c} > W_{5a}$).

According to the tire of the present embodiment, the tread portion 1 has at least two block groups $G_{B2a}$, $G_{B2b}$ whose block number densities are within the range of 0.003 (pieces/mm$^2$) to 0.04 (pieces/mm$^2$) and these block number densities $D_{2a}$, $D_{2b}$ of the block groups $G_{B2a}$, $G_{B2b}$ take at least two different values, whereby it is possible to set the block number density $D_{2a}$ of the block group $G_{B2a}$ with further increased value. Therefore, even the block groups $G_{B1}$, $G_{B3}$ whose block number densities $D_n$ are less than 0.003 (pieces/mm$^2$) are provided in tread portion 1, the on-ice performance can be improved at higher levels. That is, in the case where only one kind of the block group, whose block number density is within the range of 0.003 (pieces/mm$^2$) to 0.04 (pieces/mm$^2$), and large blocks 4 (blocks 4 in the shoulder regions $S_1$, $S_3$, for example) in a part of tread portion 1 are provided, as compared to in a case where a block group whose block number density is within the range of 0.003 (pieces/mm$^2$) to 0.04 (pieces/mm$^2$) in all over the tread portion 1, the improvement of on-ice performance will be reduced. In order to supply the deficiency of the on-ice performance, in the tread pattern shown in FIG. 6, by increasing the block number density of the block group $G_{B2a}$ which is a part of the center region $S_2$, it is possible to balance at higher levels between the improvement of the on-ice performance and other performances such as anti-uneven wear performance and driving stability in the shoulder regions $S_1$, $S_3$.

Although not shown in the drawing, the pneumatic tire, being designated a mounting direction to a vehicle, may comprise a circumferential main groove extending along the tire circumferential direction and dividing, in the tire width direction, a center region of the tread portion into sections, the center region being, on both side of the tire equatorial plane, 10% to 40% of the tread width for each side; wherein, in the situation where the tire is mounted to the vehicle, the section of the center region closer to the vehicle than the circumferential main groove includes the block group whose block number density is less than 0.003 (pieces/mm$^2$); wherein, in the situation where the tire is mounted to the vehicle, the section of the center region away from the vehicle than the circumferential main groove includes the block group whose block number density is within the range of 0.003 (pieces/mm$^2$) to 0.04 (pieces/mm$^2$). According to this tire, on-ice performance in corner running can be increased and on-snow performance in straight running can be increased by means of effect of the lateral grooves. In this way, the blocks which can provide the improved on-ice performance and on-snow performance are arranged in the high ground contacting pressure region, whereby it is possible to satisfy both of the on-ice performance and on-snow performance at high levels.

Alternatively, although not shown in the drawing, being designated a mounting direction to a vehicle, may comprise a circumferential main groove extending along the tire circumferential direction and dividing, in the tire width direction, a center region of the tread portion into sections, the center region being, on both side of a tire equatorial plane, 10% to 40% of a tread width for each side; wherein, in the situation where the tire is mounted to the vehicle, the section of the center region closer to the vehicle than the circumferential main groove includes the block group whose block number density is within the range of 0.003 (pieces/mm$^2$) to 0.04 (pieces/mm$^2$), and the section of the center region away from the vehicle than the circumferential main groove includes the block group whose block number density is less than 0.003 (pieces/mm$^2$). According to this, the large blocks arranged in the section of the center region away from the vehicle improve the anti-uneven wear against the force input from the outside in the tire width direction, while on-ice performance can be secured by the block number density in the high ground contacting pressure section of the center region closer to the vehicle being within the range of 0.003 (pieces/mm$^2$) to 0.04 (pieces/mm$^2$).

Figure 7:
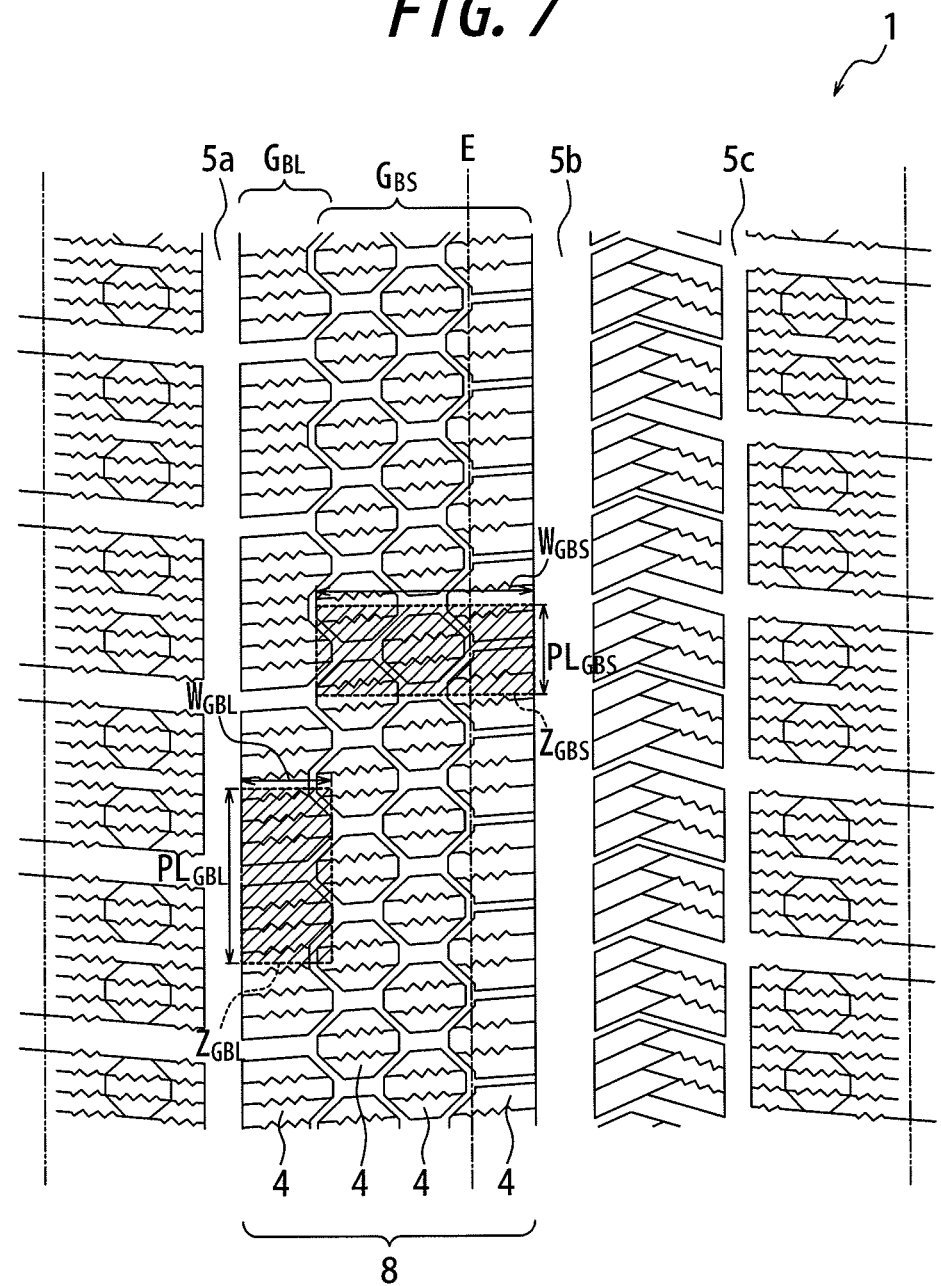
FIG. 7 is a partial development view showing a tread pattern of a pneumatic tire according to another embodiment of the present invention.

Next, another embodiment of the present invention will be described. FIG. 7 is a partial development view showing a tread pattern of a pneumatic tire according to another embodiment of the present invention. It should be noted that like elements as those in FIG. 1 are designated with like reference numerals and detailed descriptions thereof are omitted.

The tire of the embodiment shown in FIG. 7, comprises, in the tread portion 1, at least two (in this example, three) circumferential main grooves 5a, 5b, 5c extending along the tire circumferential direction, and land portions 8 which are arranged between the circumferential main grooves 5a, 5b, wherein the land portions 8 include a small block group $G_{BS}$ whose block number density D is within the range of 0.003 (pieces/mm$^2$) to 0.04 (pieces/mm$^2$) and a large block group $G_{BL}$ which is situated next to one circumferential main groove 5a of the circumferential main grooves 5a, 5b adjacent to the land portions 8, the block number density D of the large block group being less than 0.003 (pieces/mm$^2$). That is, in the same land portions 8, in order to provide the small block group $G_{BS}$ whose block number density D is relatively high, the large block group $G_{BL}$ whose block number density D is relatively low in the part adjacent to the circumferential main groove 5a. According to this, by adjacently providing block 4 whose block number density D is lower and block stiffness is higher than the blocks 4 whose block number density D is within the range of 0.003 (pieces/mm$^2$) to 0.04 (pieces/mm$^2$) in adjacent state, collapses of the blocks 4 of the small block group $G_{BS}$ are avoided, whereby it is possible to prevent the uneven wear of the tire.

Although the present invention is described by reference to the embodiments, in the present invention, it is preferable that the negative ratio $N_n$ in each block group $G_{Bn}$ is within a range of 5% to 50%. In a case where the negative ratio $N_n$ is less than 5%, groove areas become too small to obtain sufficient water evacuation performance, and each block becomes too large to realize targeted edge effect of present invention. On the other hand, in a case where the negative ratio $N_n$ is more than 50%, the ground contact area becomes too small to obtain sufficient on-ice performance.

The foregoing descriptions merely show a part of embodiments of the present invention, and the structures described above may be combined with each other and/or various modifications may be added thereto unless such combinations/modifications digress from the spirit of the present invention. For example, in the aforementioned embodiments, although it is described that tread portion is divided, in the tire width direction, into the plural region, the tread portion may be divided in the other direction such as tire circumferential direction. The outer surface shape of the block 4 is not limited to octagon, but round shape, oval shape, other polygonal shape, or irregular closed shape can be acceptable. In the aforementioned embodiments, although the circumferential main grooves are provided in the tread portion, instead of or in addition to this, inclined transverse grooves (not shown) inclining with respect to the tire width direction can be provided to define adjacent block groups by the inclined transverse grooves. According to this, it is possible to improve hydroplaning performance as well. The term "inclined transverse groove" mean groove inwhich the width thereof is wider than the minimum distance between the blocks in the same block group and the length thereof is longer than the maximum width of the block, and extending with inclining with respect to the tire width direction. Further, the circumferential main groove 4 is not limited unless including the see-through groove portion which linearly extends in the tread circumferential direction. For example, the circumferential main groove can curve like waves.

EXAMPLE

Next, tires of Examples 1 to 6 according to the present invention, a tire of Conventional Example 1 according to the conventional technique, and tires of Comparative Examples 1 and 2 are prepared, then performance evaluations regarding on-ice performance, on-snow performance, driving stability performance, and anti-uneven wear performance were made on these tires and will be described below.

The tire of Example 1 is a radial tire with 205/55R16 in size for passenger vehicle, which has the tread pattern illustrated in FIG. 1 on the tread portion. In the tire of Example 1, the block number density of the block group in the center region is lower than the block number densities of the block groups in the shoulder regions, and both of the block number densities of the shoulder regions are equal one another. The shape of the each block is octagon and the height of the each block is 8.5 mm. The tread contact width TW is 190 mm. The groove widths $W_{5a}$, $W_{5b}$ of the circumferential main grooves are respectively 11.2 mm. Other specifications of the tire of Example 1 are shown in Table 1.

The tire of Example 2 is a radial tire with 205/55R16 in size for passenger vehicle, which has the tread pattern illustrated in FIG. 2 on the tread portion. In the tire of Example 2, the block number density of the block group in the center region is higher than the block number densities of the block groups in the shoulder regions, and both of the block number densities of the shoulder regions are equal one another. The shape of the each block is octagon and the height of the each block is 8.5 mm. The tread contact width TW is 190 mm. The groove widths $W_{5a}$, $W_{5b}$ of the circumferential main grooves are respectively 10.0 mm. Other specifications of the tire of Example 2 are shown in Table 1.

The tire of Example 3 is a radial tire with 205/55R16 in size for passenger vehicle, which has the tread pattern illustrated in FIG. 3 on the tread portion. In the tire of Example 3, the block number density of the block group in the shoulder region on distal side from vehicle in the mounted state to the vehicle is lower than the block number density of the block group in the shoulder region on proximal side from the vehicle, and the block number density of the block group in the center region is lower than the block number density of the block group in the shoulder region on proximal side from the vehicle. The shape of the each block is octagon and the height of the each block is 8.5 mm. The tread contact width TW is 190 mm. The groove width $W_{5a}$ of the circumferential main groove on proximal side from the vehicle in the mounted state to the vehicle is 11.3 mm, and the groove width $W_{5b}$ of the circumferential main groove on distal side from the vehicle in the mounted state to the vehicle is 6.2 mm. Other specifications of the tire of Example 3 are shown in Table 1.

The tire of Example 4 is a radial tire with 205/55R16 in size for passenger vehicle, which has the tread pattern illustrated in FIG. 4 on the tread portion. In the tire of Example 4, the block number density $D_2$ of the block group $G_{B2}$ in the center region $S_2$ is within the range of 0.003 (pieces/mm$^2$) to 0.04 (pieces/mm$^2$), and the block number densities $D_1$, $D_3$ of the block groups $G_{B1}$, $G_{B3}$ in the shoulder regions $S_1$, $S_3$ are less than 0.003 (pieces/mm$^2$). The height of the each block 4 is 8.5 mm. Other specifications of the tire of Example 4 are shown in Tables 2 and 3.

The tire of Example 5 is a radial tire with 205/55R16 in size for passenger vehicle, which has the tread pattern illustrated in FIG. 5 on the tread portion. In the tire of Example 5, the block number density $D_2$ of the block group $G_{B2}$ in the center region $S_2$ is less than 0.003 (pieces/mm$^2$), and the block number densities $D_1$, $D_3$ of the block groups $G_{B1}$, $G_{B3}$ in the shoulder regions $S_1$, $S_3$ are within the range of 0.003 (pieces/mm$^2$) to 0.04 (pieces/mm$^2$). The height of the each block 4 is 8.5 mm. Other specifications of the tire of Example 5 are shown in Tables 2 and 3.

The tire of Example 6 is a radial tire with 205/55R16 in size for passenger vehicle, which has the tread pattern illustrated in FIG. 6 on the tread portion. In the tire of Example 6, the block number densities $D_{2a}$, $D_{2b}$ of the block groups $G_{B2a}$, $G_{B2b}$ in the center regions $S_{2a}$, $S_{2b}$ are within the range of 0.003 (pieces/mm$^2$) to 0.04 (pieces/mm$^2$) and $D_{2a} > D_{2b}$, and the block number densities $D_1$, $D_3$ of the block groups $G_{B1}$, $G_{B3}$ in the shoulder regions $S_1$, $S_3$ are less than 0.003 (pieces/mm$^2$). The height of the each block 4 is 8.5 mm. Other specifications of the tire of Example 6 are shown in Tables 2 and 3.

Figure 8:
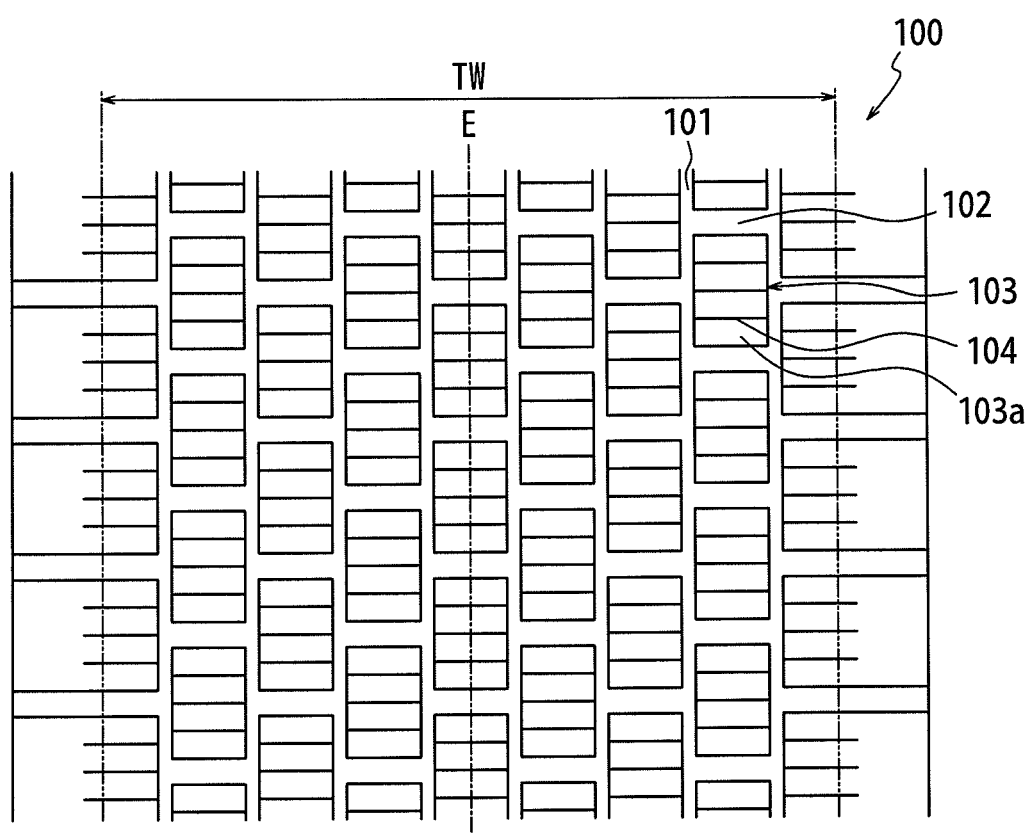
FIG. 8 is a partial development view showing a tread pattern of a conventional pneumatic tire (tire of Conventional Example 1).
Figure 9:
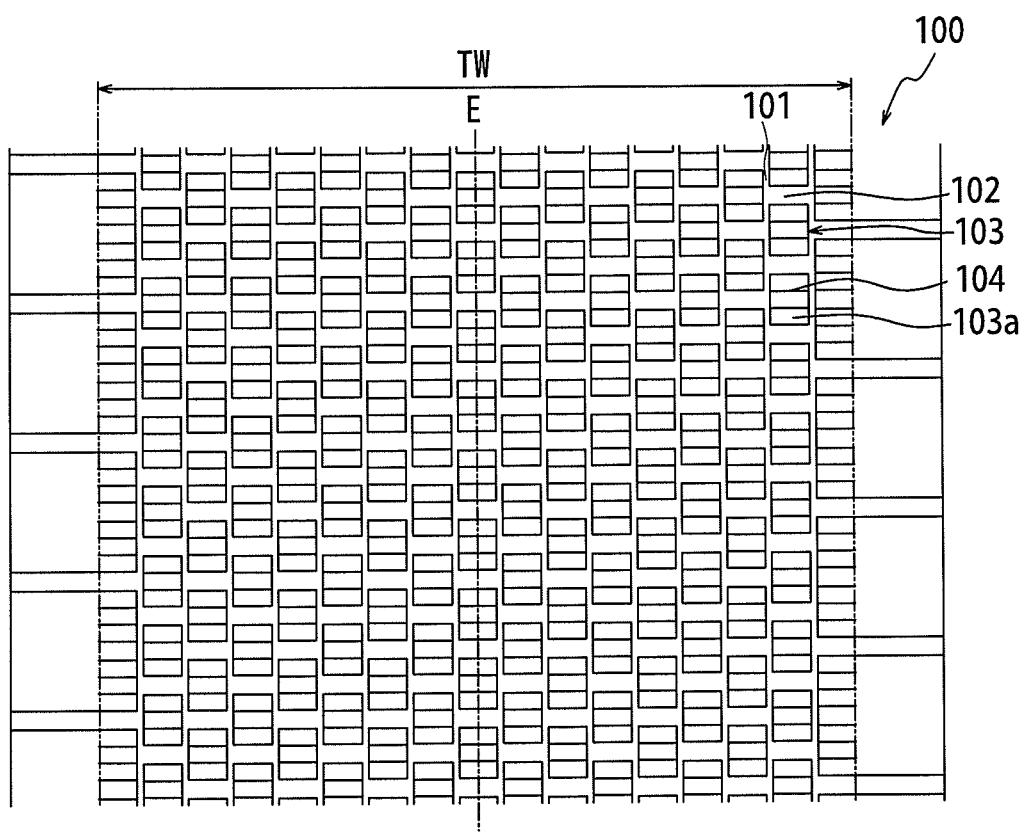
FIG. 9 is a partial development view showing a tread pattern of a comparative pneumatic tire (tire of Comparative Example 1).

For the sake of comparison, the tire of Conventional Example 1 which is a radial tire with 205/55R16 in size for passenger vehicle and has the tread pattern, as shown in FIG. 8, and whose negative ratio in the whole tread portion is 31.9%, and the tire of Comparative Example 1 which has the tread pattern, as shown in FIG. 9, and whose negative ratio in the whole tread portion is 32.6% were also prepared. The tire of Conventional Example 1 has, in the tread portion, a plurality of rectangle blocks which are defined by longitudinal grooves extending in the tire circumferential direction and lateral grooves intersecting at right angle with the longitudinal grooves. The width of the longitudinal groove is 3 mm and the depth of the longitudinal groove is 8.5 mm. The width of the lateral groove is 7.9 mm and the depth of the lateral groove is 8.5 mm. In addition, three straight sipes are provided on each block. The tire of Comparative Example 1 has, in the tread portion, a plurality of rectangle blocks which are defined by longitudinal grooves extending in the tire circumferential direction and lateral grooves intersecting at right angle with the longitudinal grooves. The width of the longitudinal groove is 1.2 mm and the depth of the longitudinal groove is 8.5 mm. The width of the lateral groove is 4.5 mm and the depth of the lateral groove is 8.5 mm. In addition, two straight sipes are provided on each block. Other specifications are shown in Table 1.

Figure 10:
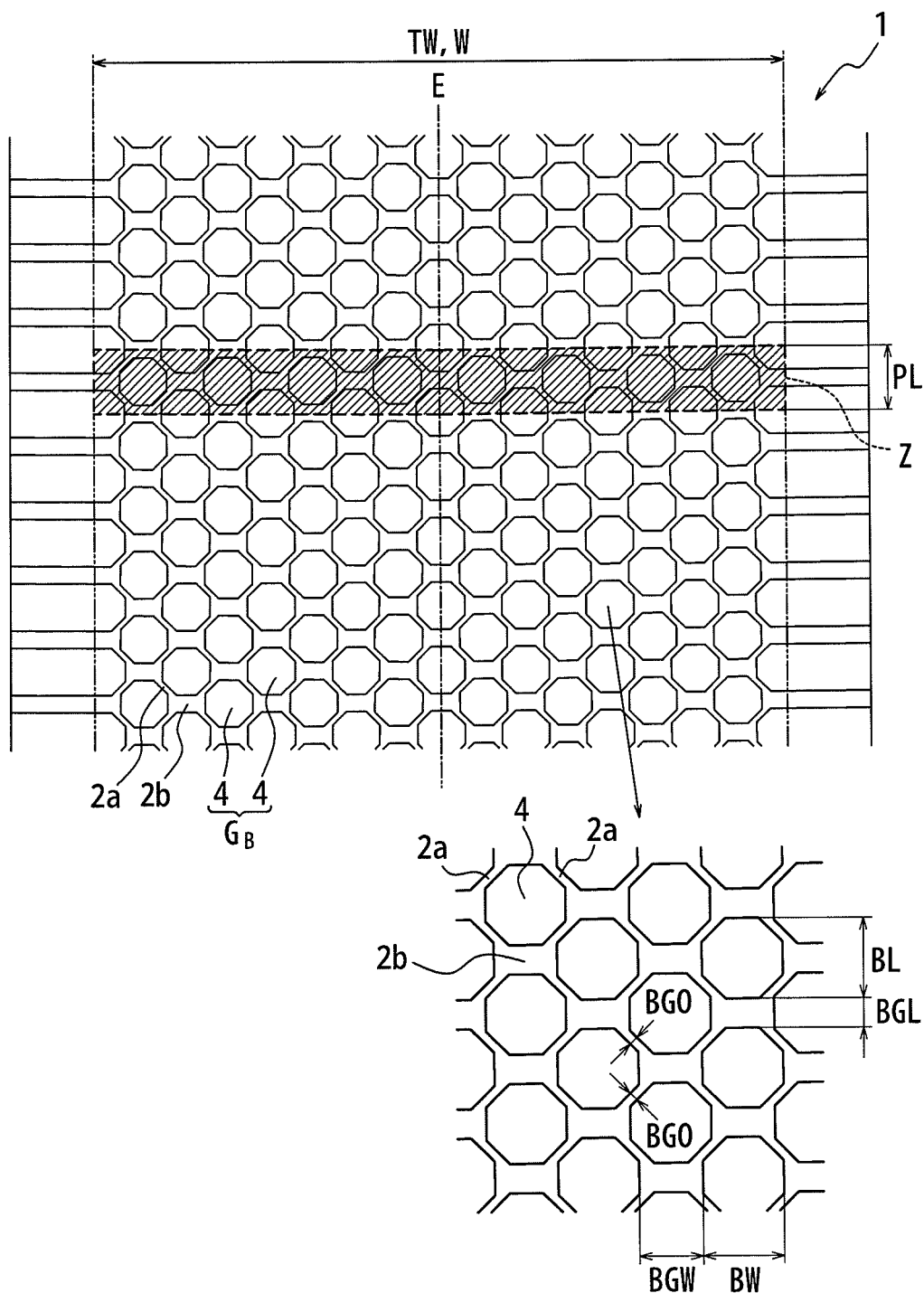
FIG. 10 is a partial development view showing a tread pattern of a comparative pneumatic tire (tire of Comparative Example 2).

For further comparison purpose, the tire of Comparative Example 2 which is a radial tire with 205/55R16 in size and has, in the tread portion, the tread pattern shown in FIG. 10 is prepared. This tire has, in the tread portion, a block group which is composed of one type of block number density. The shape of the each block is octagon, and the height of the each block is 8.5 mm. The tread contact width TW is 190 mm. Other specifications are shown in Table 1.

TABLE 1

| | | Example 1 | Example 2 | Example 3 | Conventional Example 1 | Comparative Example 1 | Comparative Example 2 |
|---|---|---|---|---|---|---|---|
| Shoulder region $S_1$ | Width $W_1$ of block group (mm) | 46.2 | 46.2 | 51.2 | — | — | — |
| | Reference pitch length $PL_1$ (mm) | 23.0 | 23.0 | 23.0 | 35.9 | 18.0 | 18.0 |
| | Circumferential length $BL_1$ of block (mm) | 13.5 | 13.5 | 9.0 | 28.0 | 13.5 | 13.5 |
| | Widthwise length $BW_1$ of block (mm) | 15.5 | 15.5 | 9.0 | 19.7 | 9.9 | 13.5 |
| | Distance $BGL_1$ between blocks (mm) | 9.5 | 9.5 | 2.5 | — | — | 4.5 |
| | Distance $BGW_1$ between blocks (mm) | 4.5 | 4.5 | 6.9 | — | — | 9.8 |
| | Distance $BGO_1$ between blocks (mm) | 1.0 | 1.0 | 0.7 | — | — | 1.1 |
| | Negative ratio $N_1$ (%) | 25.0 | 25.0 | 26.5 | 31.9 | 32.6 | 27.9 |
| | The number of block rows (lines) | 5.5 | 5.5 | 6.5 | 9 | 17 | 17 |
| | The number $a_1$ of blocks (piece) | 5.5 | 5.5 | 13 | 9 | 17 | 17 |
| | Block number density $D_1$ (piece/mm$^2$) | 0.0069 | 0.0069 | 0.01502 | 0.00194 | 0.00737 | 0.00689 |
| Shoulder region $S_2$ | Width $W_2$ of block group (mm) | 75.4 | 78.0 | 75.5 | — | — | — |
| | Reference pitch length $PL_2$ (mm) | 23.0 | 23.0 | 23.0 | 35.9 | 18.0 | 18.0 |
| | Circumferential length $BL_2$ of block (mm) | 17.3 | 9.0 | 17.3 | 28.0 | 13.5 | 13.5 |
| | Widthwise length $BW_2$ of block (mm) | 13.5 | 9.0 | 13.5 | 19.7 | 9.9 | 13.5 |
| | Distance $BGL_2$ between blocks (mm) | 5.8 | 2.5 | 5.8 | — | — | 4.5 |
| | Distance $BGW_2$ between blocks (mm) | 9.8 | 6.9 | 9.8 | — | — | 9.8 |
| | Distance $BGO_2$ between blocks (mm) | 1.2 | 0.7 | 1.2 | — | — | 1.1 |
| | Negative ratio $N_2$ (%) | 27.8 | 26.4 | 27.8 | 31.9 | 32.6 | 27.9 |
| | The number of block rows (lines) | 6 | 10 | 6 | 9 | 17 | 17 |
| | The number $a_2$ of blocks (piece) | 6 | 10 | 6 | 9 | 17 | 17 |
| | Block number density $D_2$ (piece/mm$^2$) | 0.00479 | 0.01515 | 0.00479 | 0.00194 | 0.00737 | 0.00689 |
| Shoulder region $S_3$ | Width $W_3$ of block group (mm) | 46.2 | 46.2 | 46.2 | — | — | — |
| | Reference pitch length $PL_3$ (mm) | 23.0 | 23.0 | 23.0 | 35.9 | 18.0 | 18.0 |
| | Circumferential length $BL_3$ of block (mm) | 13.5 | 13.5 | 13.5 | 28.0 | 13.5 | 13.5 |
| | Widthwise length $BW_3$ of block (mm) | 15.5 | 15.5 | 15.5 | 19.7 | 9.9 | 13.5 |
| | Distance $BGL_3$ between blocks (mm) | 9.5 | 9.5 | 9.5 | — | — | 4.5 |
| | Distance $BGW_3$ between blocks (mm) | 4.5 | 4.5 | 4.5 | — | — | 9.8 |
| | Distance $BGO_3$ between blocks (mm) | 1.0 | 1.0 | 1.0 | — | — | 1.1 |
| | Negative ratio $N_3$ (%) | 25.0 | 25.0 | 25.0 | 31.9 | 32.6 | 27.9 |
| | The number of block rows (lines) | 5.5 | 5.5 | 6.5 | 9 | 17 | 17 |
| | The number $a_3$ of blocks (piece) | 5.5 | 5.5 | 13 | 9 | 17 | 17 |
| | Block number density $D_3$ (piece/mm$^2$) | 0.0069 | 0.0069 | 0.0063 | 0.00194 | 0.00737 | 0.00689 |

TABLE 2

| | | Example 4 | Example 5 | Example 6 |
|---|---|---|---|---|
| Shoulder region $S_1$ | Width $W_1$ of block group (mm) | 33.6 | 53.18 | 33.6 |
| | Reference pitch length $PL_1$ (mm) | 36.0 | 36.0 | 36.0 |
| | Circumferential length $BL_1$ of block (mm) | 28.9 | 13.5 | 28.9 |
| | Widthwise length $BW_1$ of block (mm) | 33.6 | 13.5 | 33.6 |
| | Distance $BGL_1$ between blocks (mm) | 7 | 4.5 | 7 |
| | Distance $BGW_1$ between blocks (mm) | — | 9.8 | — |
| | Distance $BGO_1$ between blocks (mm) | — | 1.0 | — |
| | Negative ratio $N_1$ (%) | 19.8 | 27.7 | 19.8 |
| | The number of block rows (lines) | 1 | 4.5 | 1 |
| | The number $a_1$ of blocks (piece) | 1 | 5 | 1 |
| | Block number density $D_1$ (piece/mm$^2$) | 0.00103 | 0.00649 | 0.01024 |
| Shoulder region $S(S_{2a})$ | Width $W_2$ of block group (mm) | 102.72 | 63.6 | 37.42 |
| | Reference pitch length $PL_2$ (mm) | 36.0 | 36.0 | 36.0 |
| | Circumferential length $BL_2$ of block (mm) | 13.5 | 30.7 | 9 |
| | Widthwise length $BW_2$ of block (mm) | 13.5 | 26.8 | 9 |
| | Distance $BGL_2$ between blocks (mm) | 4.5 | 5.0 | 3 |
| | Distance $BGW_2$ between blocks (mm) | 9.8 | — | 6.5 |
| | Distance $BGO_2$ between blocks (mm) | 1.0 | — | 0.7 |
| | Negative ratio $N_2$ (%) | 27.7 | 28.2 | 27.5 |
| | The number of block rows (lines) | 9 | 2 | 5 |
| | The number $a_2$ of blocks (piece) | 18 | 2 | 10 |
| | Block number density $D_2$ (piece/mm$^2$) | 0.00673 | 0.00122 | 0.00673 |

TABLE 2-continued

|  |  | Example 4 | Example 5 | Example 6 |
|---|---|---|---|---|
| Shoulder region $S_{2b}$ | Width $W_2$ of block group (mm) | — | — | 67.78 |
|  | Reference pitch length $PL_2$ (mm) | — | — | 36.0 |
|  | Circumferential length $BL_2$ of block (mm) | — | — | 13.5 |
|  | Widthwise length $BW_2$ of block (mm) | — | — | 13.5 |
|  | Distance $BGL_2$ between blocks (mm) | — | — | 4.5 |
|  | Distance $BGW_2$ between blocks (mm) | — | — | 9.8 |
|  | Distance $BGO_2$ between blocks (mm) | — | — | 1.0 |
|  | Negative ratio $N_2$ (%) | — | — | 27.6 |
|  | The number of block rows (lines) | — | — | 6 |
|  | The number $a_2$ of blocks (piece) | — | — | 12 |
|  | Block number density $D_2$ (piece/mm$^2$) | — | — | 0.00679 |
| Shoulder region $S_3$ | Width $W_3$ of block group (mm) | 33.6 | 53.18 | 33.6 |
|  | Reference pitch length $PL_3$ (mm) | 36.0 | 36.0 | 36.0 |
|  | Circumferential length $BL_3$ of block (mm) | 28.9 | 13.5 | 28.9 |
|  | Widthwise length $BW_3$ of block (mm) | 33.6 | 13.5 | 33.6 |
|  | Distance $BGL_3$ between blocks (mm) | 7 | 4.5 | 7 |
|  | Distance $BGW_3$ between blocks (mm) | — | 9.8 | — |
|  | Distance $BGO_3$ between blocks (mm) | — | 1.0 | — |
|  | Negative ratio $N_3$ (%) | 19.8 | 27.7 | 19.8 |
|  | The number of block rows (lines) | 1 | 4.5 | 1 |
|  | The number $a_3$ of blocks (piece) | 1 | 5 | 1 |
|  | Block number density $D_3$ (piece/mm$^2$) | 0.00103 | 0.00649 | 0.01024 |

TABLE 3

|  | Example 4 | Example 5 | Example 6 | Conventional Example 1 | Comparative Example 1 | Comparative Example 2 |
|---|---|---|---|---|---|---|
| Tread contact width TW (mm) | 190 | 190 | 190 | 190 | 190 | 190 |
| Reference pitch length (mm) | 36.0 | 36.0 | 36.0 | 35.9 | 18.0 | 18.0 |
| Negative ratio $N_a$ in reference zone of tread portion (%) | 32.5 | 32.5 | 32.5 | 32.5 | 32.5 | 32.5 |
| The number A of blocks in reference zone of tread portion (piece) | 20 | 20 | 24 | 9 | 17 | 17 |
| Block number density Da of whole tread portion (piece/mm$^2$) | 0.00433 | 0.00453 | 0.00546 | 0.00194 | 0.00737 | 0.00689 |
| Groove width of circumferential main groove 5a (mm) | 10 | 10 | 10 | — | — | — |
| Groove width of circumferential main groove 5b (mm) | 10 | 10 | 11.7 | — | — | — |
| Groove width of circumferential main groove 5c (mm) | — | 10 | 15.4 | — | — | — |

(Performance Evaluation)

Each of the Example tires described above was assembled with a rim having a size of 6.5 J×16 at an inner pressure of 220 kPa (relative pressure), and was mounted to a vehicle. Then, the following tests were carried out to evaluate performances thereof.

(1) Evaluation Test on Braking Performance on Ice

Evaluation test on the braking performance on ice was carried out by measuring a braking distance when full brake was applied from a speed of 20 km/h on ice road. The evaluation results are shown in Table 4. Table 4 shows the results of the tires of Examples 1 to 6 and Comparative Examples 1 and 2 as index with respect to the result of the tire of Conventional Example 1 by regarding the result of the Conventional Example 1 as 100. The larger the value of each result is the better braking performance on ice is.

(2) Evaluation Test on Feeling on Snow

Evaluation test on feeling on snow was carried out by test driver's feeling when the test driver drove at various driving mode on a test course covered by compacted snow and made a comprehensive assessment of a braking performance, acceleration performance, straight traveling performance and cornering performance. The evaluation results are shown in Table 4. Table 4 shows the results of the tires of Examples 1 to 6 and Comparative Examples 1 and 2 as index with respect to the result of the tire of Conventional Example 1 by regarding the result of the Conventional Example 1 as 100. The larger the value of each result is the better feeling on snow is.

(3) Evaluation Test on Braking Performance on Snow

Evaluation test on braking performance on snow was carried out by measuring a braking distance when full brake was applied from a speed of 40 km/h on compacted snow road. The evaluation results are shown in Table 4. Table 4 shows the results of the tires of Examples 1 to 6 and Comparative Examples 1 and 2 as index with respect to the result of the tire of Conventional Example 1 by regarding the result of the Conventional Example 1 as 100. The larger the value of each result is the better braking performance on snow is.

(4) Driving Stability on Dry Road

Evaluation test on driving stability on dry road was carried out by test driver's feeling when the test driver drove at various sports driving mode on dry load. The evaluation results are shown in Table 4. Table 4 shows the results of the tires of Examples 1 to 6 and Comparative Examples 1 and 2 as index with respect to the result of the tire of Conventional Example 1 by regarding the result of the Conventional Example 1 as 100. The larger the value of each result is the better driving stability on dry road is.

(5) Anti-uneven Wear Performance (in Whole)

Anti-uneven wear performance was carried out by measuring steps between adjacent blocks after driving 5000 km at various driving mode on dry normal load. The evaluation results are shown in Table 4. Table 4 shows the results of the tires of Examples 1 to 3 and Comparative Examples 1 and 2 as index with respect to the result of the tire of Conventional Example 1 by regarding the result of the Conventional Example 1 as 100. The larger the value of each result is the better anti-uneven wear performance is.

(6) Anti-uneven Wear Performance (at Shoulder)

Anti-uneven wear performance was carried out by measuring the residual groove depth near the tread end after driving 5000 km at various driving mode on dry normal load and by evaluating from the measured residual groove depth. The evaluation results are shown in Table 4. Table 4 shows the results of the tires of Examples 4 to 6 and Comparative Examples 1 and 2 as index with respect to the result of the tire of Conventional Example 1 by regarding the result of the Conventional Example 1 as 100. The larger the value of each result is the better anti-uneven wear performance is.

TABLE 4

|  | Example 1 | Example 2 | Example 3 | Example 4 | Example 5 | Example 6 | Conventional Example 1 | Comparative Example 1 | Comparative Example 2 |
|---|---|---|---|---|---|---|---|---|---|
| Braking performance on ice | 138 | 144 | 140 | 133 | 131 | 138 | 100 | 130 | 140 |
| Feeling performance on snow | 118 | 122 | 119 | — | — | — | 100 | 110 | 120 |
| Braking performance on snow | 114 | 118 | 117 | 117 | 116 | 118 | 100 | 110 | 115 |
| Driving stability | 115 | 109 | 114 | 118 | 120 | 116 | 100 | 97 | 112 |
| Anti-uneven wear performance (in whole) | 112 | 115 | 108 | — | — | — | 100 | 95 | 110 |
| Anti-uneven wear performance (at shoulder) | — | — | — | 110 | 105 | 110 | 100 | 96 | 105 |

From the evaluation results shown in Table 4, according to the present invention, further to dramatic improvement of on-ice performance, it is possible to balance with other performances. Especially, according to the tire of Example 1, in addition to the improvement of on-ice performance, excellent driving stability can be obtained. According to the tire of Example 2, excellent on-ice/snow performances can be obtained. According to the tire of Example 3, it is possible to improve these performances in most balanced manner. According to the tire of Example 4, in addition to the improvement of on-ice performance, excellent driving stability can be obtained. According to the tire of Example 5, excellent on-ice/snow performances can be obtained. According to the tire of Example 6, it is possible to improve these performances in most balanced manner.

Industrial Applicability

According to the present invention, in addition to dramatic improvement of on-ice performance, it is possible to balance with other performances.

EXPLANATION OF REFERENCE CHARACTERS

1 Tread portion
2 Longitudinal groove
3 Lateral groove
4 Block
5 Circumferential main groove
6 Land portion
$G_{B1}$ to $G_{B3}$ Block group
$PL_1$ to $PL_3$ Reference pitch length of block
$W_1$ to $W_3$ Width of block group
$Z_1$ to $Z_3$ Reference zone

The invention claimed is:

1. A pneumatic tire comprising, in a tread portion, at least two block groups, each block group being composed of a plurality of independent blocks defined by grooves,
   wherein the block groups have at least two different values of block number densities D, each of the block number densities D being represented by the formula:

$$D = a/\{PL \times W \times (1 - N/100)\}$$

wherein PL (mm) represents a reference pitch length of the block in the block group, W (mm) represents a width of the block group, a (pieces) represents the number of the blocks existing in a reference zone of the block group, the reference zone being demarcated by the reference pitch length PL and the width W, and N (%) represents a negative ratio in the reference zone;
   wherein the block number density of at least one block group is within a range of 0.003 (pieces/mm$^2$) to 0.04 (pieces/mm$^2$),
   wherein the blocks in at least one of the block groups are arranged to be adjacent circumferentially, diagonally, and widthwise, and
   a groove distance (BGL) between blocks adjacent to each other in the tread circumferential direction is larger than a groove distance (BGO) between blocks adjacent to each other in a direction diagonal to the tread circumferential direction, and
   a groove distance (BGW) between blocks adjacent to each other in the tread width direction and across a groove between the blocks adjacent to each other in the tread circumferential direction is smaller than a length (BW) of each of the independent blocks in the tread width direction.

2. The pneumatic tire according to claim 1, wherein the block number densities of all of the at least two block groups are within a range of 0.003 (pieces/mm$^2$) to 0.04 (pieces/mm$^2$).

3. The pneumatic tire according to claim 1, wherein the block number density of at least one of the at least two block groups is less than 0.003 (pieces/mm$^2$).

4. The pneumatic tire according to claim 1, further comprising two circumferential main grooves extending along the tire circumferential direction;
   wherein one of the block groups is arranged between the adjacent circumferential main grooves;

wherein the block number density of the block group defined by the adjacent circumferential main grooves is constant.

5. The pneumatic tire according to claim 1, wherein the tread portion has a center region and shoulder regions, the center region being, on both side of a tire equatorial plane, 10% to 40% of a tread width for each side, each of the shoulder regions being, from each tread end in the tire width inward direction, 40% to 10% of the tread width;
   wherein the center region includes the block group whose block number density is within the range of 0.003 (pieces/mm$^2$) to 0.04 (pieces/mm$^2$);
   wherein each of the shoulder region includes the block group whose block number density is less than 0.003 (pieces/mm$^2$).

6. The pneumatic tire according to claim 1, being designated a mounting direction to a vehicle, and further comprising a circumferential main groove extending along the tire circumferential direction and dividing, in the tire width direction, a center region of the tread portion into sections, the center region being, on both side of a tire equatorial plane, 10% to 40% of a tread width for each side;
   wherein, in the situation where the tire is mounted to the vehicle, the section of the center region closer to the vehicle than the circumferential main groove includes the block group whose block number density is less than 0.003 (pieces/mm$^2$);
   wherein, in the situation where the tire is mounted to the vehicle, the section of the center region away from the vehicle than the circumferential main groove includes the block group whose block number density is within the range of 0.003 (pieces/mm$^2$) to 0.04 (pieces/mm$^2$).

7. The pneumatic tire according to claim 1, being designated a mounting direction to a vehicle being designated, and further comprising a circumferential main groove extending along the tire circumferential direction and dividing, in the tire width direction, a center region of the tread portion into sections, the center region being, on both side of a tire equatorial plane, 10% to 40% of a tread width for each side;
   wherein, in the situation where the tire is mounted to the vehicle, the section of the center region closer to the vehicle than the circumferential main groove includes the block group whose block number density is within the range of 0.003 (pieces/mm$^2$) to 0.04 (pieces/mm$^2$), and the section of the center region away from the vehicle than the circumferential main groove includes the block group whose block number density is less than 0.003 (pieces/mm$^2$).

8. The pneumatic tire according to claim 1, further comprising at least two circumferential main groove extending along the tire circumferential direction and forming land portion therebetween;
   wherein the land portion includes the block group whose block number density is within the range of 0.003 (pieces/mm$^2$) to 0.04 (pieces/mm$^2$), and at lease one block group adjacent to at lease one circumferential main grope and whose block number density is less than 0.003 (pieces/mm$^2$).

9. The pneumatic tire according to claim 1, further comprising, in the tread portion, at least one circumferential main groove including see-through groove portion, the see-through groove portion linearly extending in the tire circumferential direction.

10. The pneumatic tire according to claim 1, further comprising, in the tread portion, at least one inclined transverse groove inclining with respect to the tire width direction.

11. The pneumatic tire according to claim 9, wherein the at least two block groups are divided, by the circumferential main groove or an inclined transverse groove inclining with respect to the tire width direction.

12. The pneumatic tire according to claim 1, wherein, in the tread portion, equal to or more than two block groups whose block number densities are within the range of 0.003 (pieces/mm$^2$) to 0.04 (pieces/mm$^2$) and different from each other are provided.

13. The pneumatic tire according to claim 1, wherein a block number density Da (pieces/mm$^2$), in a reference zone of the tread portion, being represented by the formula:

$$Da = A/\{PL \times TW \times (1-Na/100)\}$$

wherein PL (mm) represents a reference pitch length of the block in any one of the block groups, TW (mm) represents a contact width of a tread contact area, A (pieces) represents the number of the blocks existing in a reference zone of the tread portion, the reference zone being demarcated by the reference pitch length PL and the contact width TW, and Na (%) represents a negative ratio in the reference zone of the tread portion;
   wherein the block number density Da (pieces/mm$^2$) is within a range of 0.003 (pieces/mm$^2$) to 0.04 (pieces/mm$^2$).

* * * * *